United States Patent [19]

Wang et al.

[11] Patent Number: 5,067,970

[45] Date of Patent: Nov. 26, 1991

[54] ASYMMETRIC POLYIMIDE MEMBRANES

[75] Inventors: I-Fan Wang, Olney; Bhupender S. Minhas, Columbia, both of Md.

[73] Assignee: W. R. Grace & Co.-Conn., New York, N.Y.

[21] Appl. No.: 522,003

[22] Filed: May 11, 1990

[51] Int. Cl.$^5$ .................. B01D 53/22; B01D 71/64
[52] U.S. Cl. ................................ 55/16; 55/68; 55/158; 210/500.39
[58] Field of Search .................. 55/16, 68, 158; 210/500.39

[56] References Cited

U.S. PATENT DOCUMENTS

| | | | |
|---|---|---|---|
| 4,120,098 | 10/1978 | Manos | 210/500.39 X |
| 4,240,914 | 12/1980 | Iwama et al. | 210/500.39 |
| 4,474,662 | 10/1984 | Makino et al. | 210/500.39 |
| 4,654,055 | 3/1987 | Malon et al. | 55/16 X |
| 4,661,254 | 4/1987 | Zupancic et al. | 210/500.39 X |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 210/500.39 X |
| 4,838,900 | 6/1989 | Hayes | 210/500.39 X |
| 4,929,405 | 5/1990 | Kohn | 210/500.39 X |

FOREIGN PATENT DOCUMENTS 60-150806  8/1985  Japan ................. 210/500.39

*Primary Examiner*—Robert Spitzer
*Attorney, Agent, or Firm*—Valerie E. Looper

[57] ABSTRACT

An asymmetric membrane and a method for its preparation is disclosed. The membrane is suitable for gas separation, reverse osmosis and pervaporation applications and is characterized in that it is based on a fully imidized 5(6)-amino-1-(4'-aminophenyl)-1,3-trimethylindane polymer having pore diameters of less than 20 Å units, $CO_2/CH_4$ selectivity of at least 20 and $CO_2$ permeability of at least 1.0 SCFH/ft$^2$ at 100 p.s.i.

10 Claims, No Drawings

ASYMMETRIC POLYIMIDE MEMBRANES

BACKGROUND OF THE INVENTION

(1) Field of the Invention

The present invention relates to the formation of asymmetric membranes characterized by a dense top "skin" layer. Such membranes find applications in gas separation as well as in reverse osmosis and pervaporation operations.

(2) Description of the Related Art

Successful gas separation operations require highly efficient semipermeable membranes. The membranes must fulfill certain requirements with regard to their selectivity, flux, and their chemical, thermal and physical stability.

Among various types of membranes suitable for gas separation, the so-called asymmetric membranes have revealed themselves to be exceptionally effective.

An asymmetric membrane may be defined as an entity composed of an ultra thin dense skin over a thick porous structure of the same or different material.

Asymmetric membranes have been made of various materials which include cellulose acetate, polyamides and polyimides.

The techniques for making asymmetric membranes from cellulose acetate polymers are well known and are disclosed in U.S. Pat. Nos. 3,133,132 and 3,133,137, issued on May 12, 1964 to Loeb et al.; 3,497,072, issued Feb. 24, 1970 to Cannon; and 4,026,978, issued May 31, 1977 to Mungle et al. Cellulose acetate membranes find wide application in the purification of water. However, it has been found that asymmetric cellulose acetate membranes have not been used without problems in applications such as reverse osmosis due to lack of temperature, chemical and microorganism resistance and besides these membranes are subject to degradation at pH extremes.

Polyamides are also employed in the manufacture of asymmetric membranes such as is disclosed in U.S. Pat. No. 3,567,632, issued to Richter et al. on Mar. 2, 1971. However, these membranes suffer the disadvantage of extreme sensitivity to degradation by trace quantities of chlorine and other oxidizing agents present in some process feed streams. Moreover, these polymers cannot withstand elevated temperatures.

Attention therefore has been drawn to the formation of asymmetric membranes from materials other than cellulose-based polymers and polyamides to provide membranes characterized by stronger structural properties and increased chemical resistance.

Attention has been focused on polyimide polymers, particularly aromatic polyimide polymers, as materials deemed valuable in the production of filtration membranes, and along these lines U.S. Pat. Nos. 3,899,309 by Harvey H. Hoehn et al. and 4,690,873 by Hirashi Makino may be cited. These references, while teaching aromatic polyimide materials as useful in the manufacture of gas separation membranes, do not teach formation of asymmetric membranes. U.S. Pat. No. 4,690,873 discusses dense film formation using a high boiling, toxic solvent (p-chlorophenol).

The development of asymmetric membranes made of polyimide polymers has generally been heralded as successful in meeting the needs for gas separation membranes not fulfilled by prior art materials.

The inherently greater chemical, biological, and thermal stability of polyimides over the membrane materials used in the prior art makes them attractive candidates for use in reverse osmosis, pervaporation and gas separation applications. This was recognized by J. K. Beasley of E. I. DuPont de Nemours & Company in a paper presented at the Dec. 1977 meeting of IDEA in Tokyo, where he mentioned polyimides as more suitable for reverse osmosis applications particularly, rather than three hundred other candidate polymer compositions tested.

Asymmetric membranes have a porous structure, the average pore size being in the range of from 0.01 to 1 $\mu$m, which has an extremely thin homogeneous layer on the upper side which is the actual membrane, while the porous substructure serves only as a support and has no influence on the separation characteristics. Since the active layer determining the flux of the asymmetric membranes is extremely thin (0.05 to 0.5 $\mu$m) relatively high fluxes are possible.

Asymmetric membranes are usually prepared by a so-called precipitation or phase inversion reaction. For this purpose, the polymer used for preparing the membrane is dissolved in a suitable solvent, spread into a film, and precipitated in a non-solvent.

The following U.S. patents constitute documentation of the prior art relating to the manufacture of asymmetric semipermeable membranes of polyimide materials.

U.S. Pat. No. 3,925,211, Wilhelm Schumann et al., teaches asymmetric polyimide membrane preparation by a process comprising first preparing membranes having asymmetric structures from acid amides, capable of being converted to polyimides, according to the usual precipitation or phase inversion reaction and subsequently converting these acid amide membranes to polyimide membranes by a thermal or chemical ring closure reaction.

The following is the reaction scheme shown in this reference and in references teaching variations on the same theme of starting from a tetracarboxylic acid dianhydride and a diamine to form, via an acid amide, a polyimide.

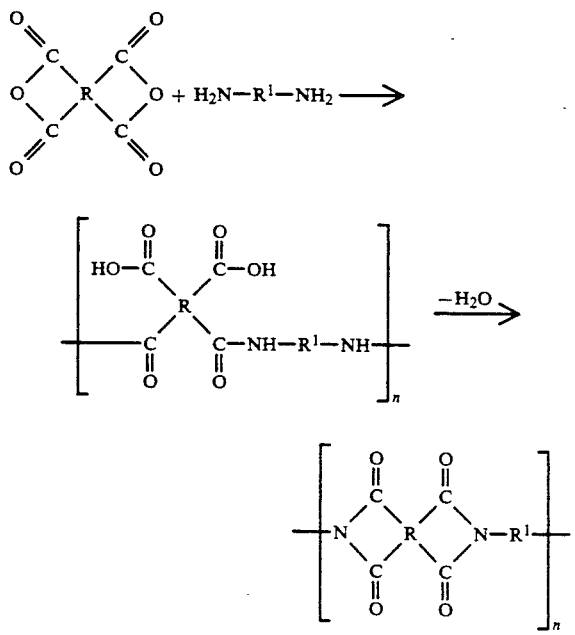

R and R' are aliphatic or aromatic groups and n is in each case selected to achieve a film forming prepolymer.

The polymers used for preparing the membrane are dissolved in a suitable solvent, spread into a film and precipitated in a non-solvent. No solvent evaporation takes place in the process taught in this reference and the area of applicability taught is that of ultrafiltration, i.e., filtration of molecular range particle sizes requiring pore sizes ranging from 0.002 to 0.1 micrometers.

U.S. Pat. No. 4,113,628 by Constance Wright Alegranti, teaches preparation of asymmetric polyimide membranes by a process comprising preparation of a polyamic acid precursor solution from diamines and tetracarboxylic acid dianhydrides, contacting said solution with a selected chemical cyclizing agent which results in the precipitation and cyclization of the polyamic acid to the polyimide. The polyimide is washed to remove solvents and no solvent evaporation step takes place. The membranes prepared according to the teachings of this reference are said to be useful in the reverse osmosis area of application, i.e., an area requiring pore sizes characterized by ionic range particle sizes ranging from 0 to 0.001 micrometers.

U.S. Pat. Nos. 4,440,643 and 4,485,056 by H. Makino et al teach asymmetric polyimide preparation also from a dope solution of a corresponding polyamic acid which is a precursor polymer of the polyimide, by coating one surface of a substrate of an aromatic polyimide with a solution containing an organic polar solvent to form a thin layer of a polyamic solution whose solvent is evaporated as the polyamic acid is cyclized to the polyimide. The area of applicability taught for these references is that of gas separation, i.e., an area requiring pore sizes in the 0–0.001 micrometer range.

U.S. Pat. No. 4,532,041 by Harry F. Shuey teaches an asymmetric polyimide membrane useful for reverse osmosis by a process comprising forming a film of the polyamic acid dope solution, contacting the film with a coagulating liquid, drying and heating to cyclize the polyamic acid of the corresponding polyimide.

U.S. Pat. No. 4,902,422 by Injo Pinnau et al. teaches a gas separation asymmetric polyimide membrane utilizing forced convection to induce phase separation, i.e., under carefully controlled conditions a moving stream is used across a static nascent membrane.

It should be also noted that polyimides can be made by other methods, for example by reaction of dianhydrides with other nitrogen-bearing polyfunctional compounds such as diisocyanates.

Finally attention is called to U.S. Pat. No. 4,908,134 by Bryce P. Anderson. This reference distinguishes itself from the previously discussed prior art in that instead of teaching asymmetric polyimide membrane preparation by phase inversion of a polyamic acid precursor, it teaches preparation of the polyimide membrane by using an already fully imidized polymer as the starting material. The polyimide material is dissolved in a solvent to which a pore forming agent is added, which is characterized by having at least about 50% more molar volume than the solvent or solvent mixture used, a solubility parameter equal to a greater than that of the solvent, a polar end, and substantial hydrocarbon character. The solution is cast onto a support and coagulated in an appropriate solvent such as water to displace the original dissolving solvent. The porous character membrane thus produced is claimed as useful in ultrafiltration applications, an operation requiring a pore size range of 20 to 2000 Å. This membrane does not have a dense top "skin" layer.

The present invention concerns itself with this latter procedure of using fully imidized polymers as starting materials in the manufacture of asymmetric polyimide membranes; however it is directed to producing membranes useful for applications in the gas separation area. Such membranes can additionally be used in the reverse osmosis and pervaporation areas. These membranes are characterized by the presence of a dense top "skin" layer having a pore size which is substantially smaller than that used in ultrafiltration applications.

Details of the invention's process for producing asymmetric polyimide membranes will therefore be outlined as the description of invention proceeds.

SUMMARY OF THE INVENTION

The subject invention is directed to a new semipermeable membrane useful in gas separation, reverse osmosis and pervaporation applications. More specifically, the invention is directed to a specific type of semipermeable membrane, namely asymmetric polyimide membranes and process of preparation thereof.

The product of the present invention is an asymmetric polyimide polymer membrane consisting of a fully imidized polymer based on 5(6)-amino-1-(4'-aminophenyl)-1,3-trimethylindane commercially available from Ciba-Geigy as Matrimid ® 5218. This polyimide membrane is characterized by a pore diameter of less than 20 Å units, a $CO_2/CH_4$ selectivity of at least 20 and a $CO_2$ permeability of at least 1.0 SCFH (standard cubic foot/hour)/$ft^2$·100 p.s.i.

The asymmetric polyimide membranes of the present invention are prepared by a process comprising the steps of preparing a polyimide dope solution including the polyimide polymer, a solvent system for said polyimide polymer, optionally a low molecular weight nonsolvent system, and additives such as viscosity enhancers and void supressors. The dope solution is cast on a support, partially evaporated under conditions such that the final product possesses a $CO_2/CH_4$ selectivity of at least about 20 and a $CO_2$ permeability of at least 1.0 SCFH/$ft^2$·100 p.s.i. The resulting cast film is immersed in a coagulating medium, washed and dried.

Details of the invention's product and process will therefore be outlined as the description of the invention proceeds.

DETAILED DESCRIPTION OF THE INVENTION

The present invention is directed at the provision of semipermeable membranes characterized by the property of being applicable in gas separation, as well as in reverse osmosis and pervaporation operations.

More specifically, the present invention is directed to asymmetric membranes finding utility in the aforementioned applications.

Gas separation is a function of membrane properties, the nature of the permeant species, and the interactions between membrane and permeant species. The permeability of a gas is determined by its product of the diffusion coefficient and its solubility coefficient rather than any sieving effects observed in ultrafiltration applications.

Reverse osmosis involves application of pressure to the surface of a saline solution in order to force pure water to pass from the solution through a membrane which does not permit passage of sodium and chloride ions.

Pervaporation is a special case of ordinary permeation by diffusion in which a membrane separates an upstream solution in the liquid state from downstream permeants in the gaseous state. The downstream side is maintained at a lower pressure to ensure the absence of liquid.

Asymmetric membranes are membranes which are characterized by being composed of an extremely thin, dense film supported on a porous substructure which may be of the same or different material as that of the membrane.

The material of the asymmetric membranes of the present invention is a polyimide, a class of polymers obtained by the condensation of dianhydrides and polyamines.

The upper thin dense film made according to the process of the present invention is presumed to be characterized by pore diameters of less than 20 Å units on the basis that its pores are below the range of detectability of the currently available scanning electron microscopic apparatus used to measure its pores. This characteristic qualifies the invention's membranes to find application in gas separation, reverse osmosis and pervaporation operations.

Other characteristics required of membranes used in gas separation and reverse osmosis operations include sufficient mechanical strength to withstand greater than 500 p.s.i. operating pressures (as compared to less than 200 p.s.i., characteristic of ultrafiltration operations). These characteristics are met by the asymmetric polyimide membranes of the present invention by virtue of process of preparation parameters which render the thin top "skin" layer sufficiently dense to withstand these pressures.

Additionally, the asymmetric polyimide membranes of the present invention are defect-free, and this is another requirement for membranes used in gas separation, reverse osmosis, and pervaporation operations. This contrasts these membranes from ultrafiltration membranes which function in a process wherein there is tolerance for some skin defects.

Having discussed some of the requirements and characteristics of the product of the subject invention, we shall now turn to a description of the invention's process and product themselves.

As mentioned previously, the manufacture of asymmetric polyimide membranes has primarily been characterized by processes comprising preparation of a polyamic acid precursor solution from diamines and tetracarboxylic acid anhydrides followed by contacting the solutions with cyclizing agents which result in the precipitation and cyclization of the polyamic acid to the polyimide.

The present invention uses a process which distinguishes itself from the aforementioned prior art primarily in that it utilizes an already fully imidized polymer as the starting material in order to arrive at the invention's product, which is an asymmetric polyimide filtration membrane.

In the present invention a fully imidized polyimide polymer was dissolved in a solvent, or solvent system which is water miscible, a film of the solution was cast onto a substrate, the solvent was partially evaporated therefrom, the film and substrate were then immersed into a coagulating medium and subsequently air dried. The resulting membranes proved themselves to be highly effective in the application of gas separation, reverse osmosis and pervaporation.

More precisely a specific description of each aspect of the process and materials used in the present invention follows.

The starting raw material chosen in reducing the present invention's concept to practice was a proprietary fully imidized thermoplastic polyimide polymer available from Ciba-Geigy and known as Matrimid ® 5218 (also known as XU-218). This polyimide polymer is based on 5(6)-amino-1-(4'-aminophenyl)-1,3-trimethylindane and has the following structure:

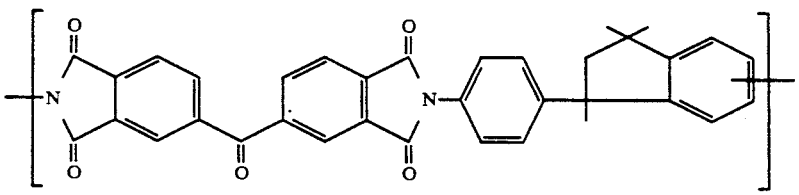

A polyimide polymer dope solution was prepared by dissolving the fully imidized polyimide polymer based on 5(6)-amino-1-(4'-aminophenyl)-1,3-trimethylindane in one or a mixture of the following water-miscible solvents: N-methyl-2-pyrrolidone, hereinafter referred to as NMP, tetrahydrofuran, hereinafter referred to as THF, N,N,-dimethylformamide, hereinafter referred to as DMF, dioxane and γ-butyrolactone.

The weight percent of the polyimide polymer in solution may range from 10 to 35% in the broadest sense, although a 15 to 30% range is preferable and a 20 to 28% range will produce the best results.

Low boiling solvents were preferably chosen because use of high boiling solvents seriously limits the manufacturing of asymmetric membranes inasmuch as the need for their evaporation limits the choice of support materials used for forming these asymmetric membranes. Optionally, however, mixtures of high and low boiling solvents may be used and the preferable proportions in weight % of low boiling solvent, i.e., boiling at less than 102° C., to high boiling solvent, i.e., boiling at higher than 150° C., are 90:10 to 10:90, preferably 25:75 to 75:25. As examples of low boiling solvents usable in this context are tetrahydrofuran and dioxane, and as examples of high boiling solvents usable herein are N-methyl-2-pyrrolidone, N,N-dimethylformamide and γ-butyrolactone.

In addition to the aforementioned components of the solvent system usable in the present invention, a low molecular weight non-solvent system may be used in amounts of less than 10% by weight of the polyimide polymer dope solution, preferably less than 8%. The components of said non-solvent system are selected from the group including water, ketones, alcohols, and formamide.

Additives such as viscosity enhancers may be present in amounts up to 3% by weight of the polyimide polymer dope solution and these include polyvinyl pyrrolidones, polyethylene glycols and urethanes. Additionally additives such as void suppressors may be used in amounts up to 5% of the weight of the polyimide polymer dope solution, and in this case maleic acid produces the desired results.

As previously explained, once the polyimide polymer is dissolved in the solvent system described, it is cast onto a substrate and the solvent is evaporated under conditions sufficient to produce a polyimide membrane having a $CO_2/CH_4$ selectivity of at least 20, preferably at least 30, and a $CO_2$ permeability of at least 1.0 $SCFH/ft^2 \cdot 100$ p.s.i. and preferably at least 2.0 $SCFH/ft^2 \cdot 100$ p.s.i. Typical evaporation conditions adequate for this purpose include an air velocity of 0 to 6 SCFM (standard cubic feet per minute), preferably 0 to 3 SCFM, at 15° to 25° C. for a drying duration of less than 30 seconds.

The coagulating medium may consist of water, alcohol, ketones or mixtures thereof, as well as additives such as surfactants, e.g,. Triton X-100 ® (octylphenoxy-polyethoxyethanol). The conditions for effecting coagulation are conventional and obvious to the skilled artisan.

The asymmetric polyimide membranes of the present invention can be washed and dried according to the following techniques. Typically an alcohol such as methanol, ethanol or mixtures of water and alcohol can be used for removing the residual solvent (e.g., NMP) from the membrane. Alternatively the membrane may be washed with water for approximately one hour or more and then it may be soaked in isopropanol for 2.0 hours followed by drying at ambient temperatures for 24.0 hours.

Once the membranes are formed they may be processed into spirally wound modules, into hollow fiber configurations, or into flat sheet configurations. These membranes may be further reacted with other functional groups bearing materials such as isocyanates, amines or acid chlorides so as to form thin-film-composite membranes. The product of the present invention exhibits high temperature resistance, high solvent resistance and moisture resistance.

The dense ultra-thin top "skin" layer of the invention's asymmetric polyimide membrane is characterized by pore sizes below 20 Å in diameter, is highly resistant to the greater than 500 p.s.i. operating pressures encountered in gas separation and reverse osmosis operations, and it is theorized that many of these properties which particularly qualify the invention's utility in the areas mentioned are attributable to the following fundamental features which distinguish it from the prior art as embodied particularly by the previously discussed Anderson reference (U.S. Pat. No. 4,908,136). The invention's process (a) does not utilize a high molecular weight pore former (such as caprolactam) and (b) uses a solvent evaporation step prior to coagulation in the formation of the dense filtration film which could be practically designated as "poreless" in view of the minute dimensions of the pores present relative to the filtration film of the asymmetric polyimide membrane taught by Anderson, which is taught as finding application in ultrafiltration processes characterized by pore sizes in the range of 20 to 2000 Å, a range which would render the membrane worthless in areas such as gas separation, reverse osmosis and pervaporation.

Permeability measurements shown in these examples represent permeabilities of the invention's asymmetric polyimide membranes to pure $CO_2$ and pure $CH_4$, and these measurements were undertaken by using a soap bubble flow meter apparatus in which the membrane was exposed to a feed gas at 100 p.s.i. for $CO_2$ or 300 p.s.i. for $CH_4$.

Selectivity measurements shown in these examples represent the ratio of the $CO_2$ permeability to the $CH_4$ permeability.

The following examples, while in no way intended to be limiting, will further aid in the understanding of the present invention.

Unless otherwise specified all percentages given in the following examples are by weight.

EXAMPLE 1

A polyimide based on 5(6)-amino-1-(4'-aminophenyl-1,3-trimethylindane, commercially available from Ciba-Geigy as Matrimid ® 5218, and hereinafter referred to as Matrimid ® 5218, was dissolved in NMP and THF (2:1 by weight), to give a 24% solution by weight. 1% by weight polyvinylpyrrolidone (PVP) was added to the solution. A film of polymer solution was cast onto a polyester backing material using a 7 mils doctor blade. This film was left for an evaporation time of 12 seconds (ambient temperature) at an air flow of 1.0 SCFM in a coanda air chamber. The film and backing were then immersed into a bath of water/methanol (60/40 by weight) to induce coagulation. After coagulation the membrane was washed with deionized water and then air dried at ambient temperatures for at least 24.0 hours.

The prepared asymmetric polyimide membrane was placed in an apparatus for measuring gas permeability. The results were as follows:

| Gas | Permeability ($SCFH^*/ft^2 \cdot 100$ p.s.i.) |
| --- | --- |
| $CO_2$ | 5.011 |
| $CH_4$ | 0.1149 |
| $CO_2/CH_4$ | 43.61 |

*Standard cubic foot/hour.

EXAMPLE 2

A dope solution was prepared, consisting of 22% by weight of Matrimid ® 5218, 50% by weight of THF and 28% by weight of NMP. This dope solution was cast onto a polyester backing material using a 10 mils doctor blade. The film was then exposed to air for 6 seconds at an air flow of 0 SCFM before immersing into a water/methanol (65/35 by weight) bath. After ~1.5 minutes residence time the film and backing were transferred to a deionized water bath for ~2 hours washing before air drying according to Example 1. This asymmetric polyimide membrane had a $CO_2/CH_4$ selectivity of 53.7 and a $CO_2$ permeability of 3.2 $SCFH/ft^2 \cdot 100$ p.s.i.

EXAMPLE 3

A dope solution was prepared consisting of 22% by weight of Matrimid ® 5218, 78% by weight of DMF. This dope solution was cast onto a non-woven polyethylene backing using a 6 mil gap doctor blade. The film was then left for 5 seconds at an air flow of 0 SCFM before immersing into a water/methanol (50/50 by volume) bath. Next it was washed for about an hour with deionized water before air drying according to Example 1. A coating solution was prepared by dissolving 1% polyhydromethylsiloxane (Dow Corning) in hexane and 0.1% by weight of catalyst zinc octoate (in 2-propanol) was also added. The membrane was soaked for 30 minutes, and excess solution subsequently drained off.

After air drying the membrane was tested and revealed a $CO_2/CH_4$ selectivity of 45.29 and a $CO_2$ permeability of 12.62 SCFH/ft$^2\cdot$100 p.s.i.

The invention's preferred embodiments are characterized by the preparation of asymmetric polyimide membranes by dissolution of the starting polyimide polymer in a mixed solvent system comprising one low boiling solvent (b.p. <102° C.) selected from the group of tetrahydrofuren and dioxane, and one higher boiling solvent (b.p. >150° C.) selected from the group of N-methyl-2-pyrrolidone, N,N-dimethylformamide and γ-butyrolactone. The solvents are then removed by partial evaporation under conditions of air velocity, temperature, and time such that the eventual asymmetric membrane product will exhibit the desired physical property characteristics, namely a pore diameter of less than 20 Å units, a $CO_2$ permeability of at least 1.0 and a $CO_2/CH_4$ selectivity of at least 20. The coagulation, washing and drying steps, as described elsewhere in this invention's description, then follow.

EXAMPLE 4

A dope solution consisting of Matrimid ® 5218 was dissolved in N-methyl-2-pyrrolidone, the solution was cast onto a substrate and subsequently exposed to air at 80° C. to 120° C. for less than 2 minutes before coagulating in water. The asymmetric polyimide membrane was then washed and air dried.

EXAMPLE 5

Asymmetric polyimide membranes were prepared according to the methodology outlined in Examples 1 through 4. The water removal step following the coagulating step was carried out by solvent exchange, i.e., the membrane was rinsed with isopropyl alcohol to displace the water, and subsequently the isopropyl alcohol was replaced by hexane following which the membrane was air dried.

EXAMPLE 6

Asymmetric polyimide membranes were prepared by casting a 26% by weight solution of Matrimid ® 5218 polymer in a solution of formamide:maleic acid:THF:NMP (3:1.5:24:45.5 by weight) onto a woven nylon backing material using a 6-mil knife gap. The membrane was evaporated for 9 seconds at an air flow of 2 SCFM at ambient temperature using an air knife, then immersed together with the backing into a water bath containing 0.1% Triton X-100 surfactant (octyl-phenoxy-polyethoxyethanol). After coagulation, the resulting asymmetric membrane was washed with deionized water with Triton X-100 surfactant in a recirculating bath for 24 hours, and then soaked in isopropanol for 2 hours and then dried for 24 hours at ambient temperature. The dried membrane was tested for gas permeability. The permeability of the membranes to pure $CO_2$ and pure $CH_4$ was measured with a laboratory apparatus in which the membrane was exposed to a feed gas (either 100 p.s.i. $CO_2$ or 300 p.s.i. $CH_4$). The results were as follows:

| Gas | Permeability (SCFH/ft$^2$ • 100 p.s.i.) |
| --- | --- |
| $CO_2$ | 6.6 |
| $CH_4$ | 0.14 |
| $CO_2/CH_4$ | 47 |

EXAMPLE 7

Casting solutions of Matrimid ® 5218 were prepared according to the methodology outlined in Examples 1 through 6. The casting solutions were then formed into hollow fibers by the use of a die before coagulation, washing and drying steps. Extrusion or pumping the cast solutions through a die prior to coagulating, washing, and drying was an alternative used in forming said membranes into asymmetric membranes of a hollow fiber configuration.

EXAMPLE 8

The following is submitted as a comparative example primarily focusing on the formation of the dense top film of the present invention without proceeding with the procedural steps leading to the formation of an asymmetric membrane.

A 15 wt. % solution of Matrimid ® 5218 was prepared in NMP. The solution was coated onto a glass plate with a casting blade set at a thickness of 250 μm. The membrane was placed in a vacuum oven at room temperature for 12 hours, was heated at 80° C. for 12 hours, and at 160° C. for another 12 hours. The dry membrane was then delaminated from the glass plate in water and placed in a vacuum oven and heated at 150° C. for 12 hours. The permeability of pure $CO_2$ and $CH_4$ was measured at a pressure of 215 psia. The permeability of the membrane to the gas was determined by allowing the gas that permeated through the membrane to fill an evacuated reservoir of known volume. The permeability was calculated by using the Ideal Gas Law. The results were as follows:

|  | Permeability* |
| --- | --- |
| $CO_2$ | 86.68 |
| $CH_4$ | 1.48 |
| $CO_2/CH_4$ selectivity | 58.5 |

*Permeability in Barrers = $10^{-10} \times cm^3 \times cm \times cm^{-2} \times sec.^{-1} \times (cmHg)^{-1}$ While the illustrative embodiments of the invention have been described with particularity, it will be understood that various other modifications will be apparent to and can be readily made by those skilled in the art without departing from the scope and spirit of the invention. Accordingly, it is not intended that the scope of the claims appended hereto be limited to the examples and descriptions set forth herein, but rather that the claims be construed as encompassing all the features of patentable novelty which reside in the present invention, including all features which would be treated as equivalents thereof by those skilled in the arts to which the invention pertains.

What is claimed is:

1. An asymmetric polyimide membrane comprising a unitary membrane having a thin dense skin supported on a porous substructure, characterized in that (a) said skin and substructure are composed of a fully imidized polymer based on 5(6)-amino-1-(4'-aminophenyl)-1,3-trimethylindane;
(b) it has a pre diameter of less than 20 Å;
(c) it has a $CO_2/CH_4$ selectivity of at least 20; and
(d) it has $CO_2$ permeability of at least 1 SCFH/ft$^2$ at 100 psi.

2. The asymmetric polyimide polymer membrane according to claim 1 wherein said $CO_2/CH_4$ selectivity is at least 30 and said $CO_2$ permeability is at least 2.0 SCFH/ft$^2$ at 100 p.s.i..

3. The asymmetrical polyimide polymer membrane according to claims 1 or 2 characterized in that it is formed into a flat sheet.

4. The as polyimide polymer membrane according to claims 1 or 2 characterized in that it is formed into a hollow fiber configuration.

5. The membrane of claim 1 having mechanical strength sufficient to withstand a pressure of at least 500 psi.

6. The process of preparing a polyimide polymer membrane having a pore diameter of less than 20 Å units, a $CO_2/CH_4$ selectivity of at least about 20, and a $CO_2$ permeability of at least 1.0 SCFH/ft$^2$ at 100 p.s.i., said process comprising the steps of:
(a) preparing a polyimide dope solution consisting essentially of:
  (1) a fully imidized polyimide polymer based on 5(6)-amino-1-(4'-aminophenyl)-1,3-trimethylindane present in amounts of 20 to 28% by weight of said dope solution;
  (2) a solvent system for said polyimide which is water miscible and is selected from the group consisting essentially of N-methyl-2-pyrrolidone, tetrahydrofuran, N,N-dimethylformamide, dioxane, $\gamma$-butyrolactone or a mixture thereof;
  (3) a low molecular weight non-solvent system present in amounts of less than 10% by weight of said dope solution consisting essentially of water, ketones, alcohols, or formamide;
  (4) a viscosity enhancer present in amounts of less than 3% by weight of said dope solution consisting essentially of polyvinyl pyrrolidones, polyethylene glycols or urethanes;
  (5) a void supressor present in amounts of less than 5% by weight of said dope solution consisting essentially of maleic acid;
casting a film of said polyimide dope solution onto a supporting substrate;
(c) evaporating said solvent system under conditions of time, temperature and air flow rate sufficient to produce a polyimide membrane final product characterized by a $CO_2/CH_4$ selectivity of at least about 20 and a $CO_2$ permeability of at least about 1.0 SCFH/ft$^2$ at 100 p.s.i.;
(d) immersing said film cast on said substrate into a coagulating medium consisting essentially of water, alcohol, ketones or mixtures thereof; and
(e) washing and drying the thusly prepared asymmetric polyimide membrane.

7. The process of preparing a polyimide polymer membrane according to claim 6 under conditions of time, temperature, and air flow rate sufficient to produce a polyimide membrane final product characterized by a $CO_2/CH_4$ selectivity of at least 30 and a $CO_2$ permeability of at least 2.0 SCFH/ft$^2$ at 100 p.s.i.

8. The process of claim 6 characterized in that said solvent system consists of a mixture of two solvents, one solvent having a boiling point of less than 102° C. selected from the group consisting essentially of tetrahydrofuran and dioxane and the other solvent having a boiling point of greater than 150° C. selected from the group of N-methyl-2-pyrrolidone, N,N-dimethylformamide and $\gamma$-butyrolactone wherein the proportions of said high boiling point solvent to said low boiling point solvent present are from 25:75 to 75:25.

9. The asymmetric polyimide polymer membrane prepared according to the process of claim 6 or 7 characterized in that it is formed into a flat sheet configuration.

10. The asymmetric polyimide polymer membrane prepared according to the process of claim 6 or 7 characterized in that it is formed into a hollow fiber configuration.

* * * * *

UNITED STATES PATENT AND TRADEMARK OFFICE
CERTIFICATE OF CORRECTION

PATENT NO. : 5,067,970

DATED : November 26, 1991

INVENTOR(S) : I-Fan Wang, Bhupender S. Minhas

It is certified that error appears in the above-identified patent and that said Letters Patent is hereby corrected as shown below:

Col. 11, line 4, Claim 1, delete "pre" and add --pore--.

Signed and Sealed this

Ninth Day of March, 1993

Attest:

STEPHEN G. KUNIN

Attesting Officer

Acting Commissioner of Patents and Trademarks